May 26, 1959  J. H. SHERTS ET AL  2,888,360
JOINTS BETWEEN CELLULATED GLASS AND MORTAR-LIKE MATERIALS
Filed Dec. 9, 1955

INVENTORS
JAMES HERVEY SHERTS &
ROBERT W. MOORMAN
BY
Oscar B. Spencer
ATTORNEY

United States Patent Office 2,888,360
Patented May 26, 1959

2,888,360

JOINTS BETWEEN CELLULATED GLASS AND MORTAR-LIKE MATERIALS

James Hervey Sherts, Pittsburgh, and Robert W. Moorman, Springdale, Pa., assignors to Pittsburgh Plate Glass Company, Allegheny County, Pa.

Application December 9, 1955, Serial No. 552,145

10 Claims. (Cl. 117—8)

This invention relates to a joining material for retaining set coatings of a mortar of a hardenable material to a structural material to which it is not well adapted to adhere. It has particular relation to the use of foamed polyurethane resin as a joining material for securing mortars comprising calcined gypsum or Portland cement or the like to glass and other materials which are hard and nonyielding and from which the mortar tends to shear by reason of shrinkage of the mortar in setting or differences in thermal expansion or contraction.

In the joining of glass and notably of structural glasses, such as foamed glass of the type produced under Long Patent 2,123,526 and the like, to mortars, and pastes such as those of gypsum plaster or of Portland cement or paints, plastisols and organisols of plastics, as a bonding agent, difficulty of obtaining an adequate and permanent union is experienced. This is due at least in part to the fact that the mortar in setting, tends to shrink whereas the glass body to which it is applied does not undergo a corresponding shrinkage. Also the coefficients of thermal expansion between the two types of materials usually are very different and as a result, as the temperature of the ambient atmosphere about the materials fluctuates due to climatic changes and other factors, severe shearing stress is placed upon the two types of materials, which often results in failure of the bond between them. In order to obviate this difficulty, it has heretofore been customary to obtain a bond between structural glasses, such as the cellular glass of the type produced under the provisions of the Long patent and others, by applying to the surface of the cellular glass a cushioning organic material and notably an asphaltic mastic material which is adapted by reason of its soft plastic state to allow for the differences in contraction and expansion of the materials being bonded together. However, such bonding or intermediate materials have not proven to be entirely satisfactory inasmuch as they are thermoplastic in nature and retain their plasticity or mastic characteristics over a long period after the application of plaster and may tend to yield under continuous force. Moreover, because of their tacky nature, it is necessary that they be applied on the job, as for example in the construction of a building, rather than in the factory producing the cellular glass. This entails added stocks of material and added operations on the job where the skill and integrity of the laborer are hard to control.

This invention is based upon the discovery that foamed polyurethane resin and notably those having a surface comprising multitudinous open cells are excellently adapted for use as an intermediate layer between various set mortars or mortar-like materials and relatively brittle nonyielding materials such as cellulated glass. Such foams can be applied to slabs of the material in a factory with suitable equipment and with specialized labor to assure uniformly good results. The foams become permanently set so that they are devoid of tack and if the foam layer is subjected to pressure it does not adhere to the body with which it contacts, and it does not flow. Indeed, it acts as an excellent protective layer during shipping and storage of the body to which it is applied.

Foamed polyurethane resins which are adapted to adhere to or be adhered to relatively nonyielding bodies such as plates of glass, or preferably slabs of cellular glass of the type disclosed in the afore-mentioned patent to Long to provide a joint or intermediate layer for various types of setting mortars, such as gypsum plaster, Portland cement, lime and sand, paints, plastisols and organisols of plastics, or the like, usually are formed from a blend of two desired materials. One (A) comprises a material containing a plurality of hydroxyls per molecule and is mixed with water. The second (B) comprises a plurality of isocyanate groups per molecule but no water. The isocyanate-containing group reacts simultaneously to cross link the molecules containing hydroxyls and to generate carbon dioxide gas which is entrapped.

A common and very satisfactory type of material for package A comprises so-called polyesters. These are obtained by reaction of di- or polyhydric alcohol with one or more dicarboxylic acids, preferably those which are free of groups such as alpha-beta ethylenic unsaturation or other unsaturation than benzenoid unsaturation, and being represented by aliphatic dicarboxylic acids, such as adipic acid, sebacic acid, azelaic acid, or the like; or by aromatic dicarboxylic acids, such as phthalic acid, terephthalic acid or isophthalic acid. The alcohols contain a plurality of hydroxyls and are represented by ethylene glycol, diethylene glycol, propylene glycol, butane diol-1,3, dipropylene glycol, etc. These are often mixed with polyhydric alcohols such as glycerol or pentaerythritol. The ester should have a plurality of available hydroxyls per average molecule and usually are formed by reacting the acids with an excess of the alcohol component.

The presently preferred material containing plural isocyanate groups comprise tolylene diisocyanates such as Mondure-T.D., Desmodur-T or Hylene-TM. However, other materials containing a plurality of isocyanate groups per molecule may be employed. These include: chlorophenyl 2,4-diisocyanate, p-phenylene diisocyanate, diphenylene 4,4'-diisocyanate, hexamethylene diisocyanate, and prepolymers of these obtained by reacting these compounds in the absence of water with a compound containing plural hydroxyls but the amount of the latter being sufficient to react with only one isocyanate group in the diisocyanate molecules.

The general principles involved in the reaction of compounds containing a plurality of hydroxyls per molecule with a compound containing a plurality of isocyanate groups per molecule are discussed in an article by Bayer et al., "Rubber Chemistry and Technology," volume 23, pages 812–835, and again in an article by A. C. Stephenson, "Rubber Age," volume 77, Number 1, pages 63 to 68, or in an article by Francis Bello, in "Fortune," March 1955, pages 110 through 113 and continuations thereof in the same magazine on pages 166 and 169.

In the preparation of a foam of a polyurethane resin, it is customary to mix or emulsify the component containing a compound having a plurality of hydroxyls per molecule, with water or to add a pulverized and hydrated salt such as the trihydrate of sodium acetate, Glauber's salt or the like, which under reaction conditions involved in the preparation of the foam decompose to liberate water.

Emulsification of water and the hydroxy compound to form component A may be promoted by addition of a small amount of an emulsifying agent. The emulsifying agents may be anionic, cationic or non-ionic or mixtures thereof and being represented by Emcol–H–77, Tween–40 and others. Usually the compound containing the isocyanate groups but without water or water supplying agent is kept separate as component (B) and is mixed with component (A) as rapidly as possible. One or both components may contain a catalyst of reaction such as a tertiary amine, e.g. an N-alkyl morpholine such as N-methyl, N-ethyl or N-lauryl morpholine or a quaternary ammonium salt thereof, such as that of acetic anhydride and N-methyl morpholine. Other tertiary amines such as dimethyl ethanol amine, trimethyl amine or triethyl amine may also be used as catalysts.

The mixture immediately after, or during formation is laid down upon the surface such as that of a slab of cellular glass to which a coating of mortar-like material is to be applied. In some instances, the two components are applied from separate sources to a common surface, being mixed as they are laid down. In others, the two components are mixed and quickly spread before substantial foaming occurs. Many of the hydroxyl containing materials and isocyanates, when so laid down upon a surface, will foam and polymerize even at room temperature or under their own exothermal heat. If desired, however, the cure may be promoted by the application of external heat.

It is an important feature of the present invention that the polyurethane foams to which a mortar such as gypsum plaster or Portland cement is to be applied have highly rugose surfaces; preferably, such surfaces comprise open cells, into which mortar can penetrate. When a foam layer is formed upon an appropriate backing body, such as a slab or plate of glass or preferably a slab of cellular glass, the surface of the foam, if the mixture is left free, is smooth and relatively non-permeable. Such surfaces are not well adapted to receive and retain mortars such as those of gypsum plaster, or Portland cement. If adequate adhesion between the mortar and the foam is to be obtained, the surface must be opened as for example by abrading, skiving or slicing away a portion of the foamed material. When this operation is performed, the surface of the foamed layer is found to comprise a multiplicity of open cells of small diameter into which mortars of the foregoing type will flow and when the mortar is set, it will assume the shape of the cells, being locked in the latter and also tending to grip the side walls of the cells between the beads or protuberances extending into the cells. Similar surfaces can be provided by laying down upon a backing slab a layer of foamable mixture and while it is still soft and plastic, laying down upon it a second slab of foamable material to form a three layer sandwich. By curing and splitting the sandwich the two slabs are obtained, each having a foam layer of polyurethane resin and each layer having a face composed of a multiplicity of cells and being adapted to bond to mortar.

The removal of the skin from the foamed layer to provide open cells need not necessarily be performed by slicing or skiving. If preferred, it may also be performed by scarifying the surface of the foam with a suitable abrading body such as a wire brush designed to tear open the cells in the surface to a sufficient degree to permit the mortar material subsequently to be applied to penetrate the cells and thus effect bonding action between the mortar as it sets and the foam layer underneath.

For purposes of illustration, the principles of the invention will now be described as applied to a foam of a polyurethane resin upon a body such as a slab of cellular glass of the type already described for purposes of providing a surface adapted to receive a coating of mortar such as gypsum or Portland cement. In the drawings.

Figure 1:
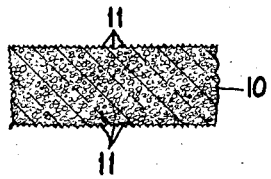
Fig. 1 is a sectional view illustrating a fragment of a slab of cellulated glass such as might be provided with coatings of polyurethane resin foam for reception of appropriate mortar.

The slab or body 10 of cellular glass, as illustrated in Fig. 1, may be prepared by the techniques already referred to in the Long patent, by mixing finely pulverized glass with a gassing agent such as carbon black (in small amount) and heating the mixture to sinter the particles of glass and to liberate bubbles of gas, such as carbon dioxide and other gases, in the sintered mass. The cellular slabs thus formed are annealed in well known manner. The surface layers of the cellulated cake or slab thus formed are usually sliced or abraded away to provide a surface composed of a multitude of open cells or open pockets as indicated at 11, portions of which have been broken away. This surface is well adapted for the reception and retention of a foamable mixture of resin. The product sold by the Pittsburgh Corning Corporation under the trade name of Foamglas may be used if desired.

Figure 2:
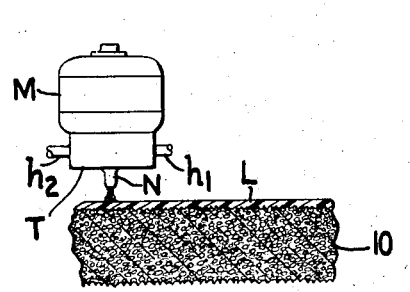
Fig. 2 is a sectional view of a fragment of a slab to which a foam mixture has been applied.
Figure 3:
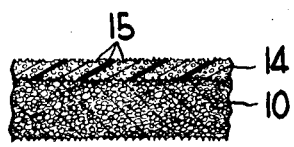
Fig. 3 is a sectional view of the fragment of Fig. 2 after the mixture has foamed and cured.
Figure 4:
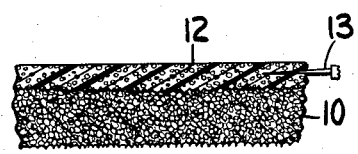
Fig. 4 illustrates a fragment of a slab to which a foam layer has been applied and from which a surface layer is being sliced in order to provide open cells suitable for the reception of mortar.

A foamable mixture, as for example of a polyester emulsified with water or other hydrating agent and a diisocyanate, is laid down as indicated at 12 in Fig. 2. The operation may be performed by spraying an emulsion of polyester and water and a material containing a plurality of isocyanate groups from separate nozzles upon the same surface; or as shown, by feeding polyester (package A) and isocyanate (package B) material concurrently through hose connections $h_1$ and $h_2$ into a turbo mixer T driven by motor M. The foamable mixture is discharged as a liquid, unfoamed layer L upon the surface of the slab 10.

The foamable mixture, it will be observed, penetrates into the small cups or cavities provided by the cells in the surface of the slab of cellulated glass so that the foam is well keyed to the latter. A second slab could also be laid on the fluid mixture to provide a three layer sandwich adapted to be split apart through foam layer, after it is cured. Two slabs each having a foamed bonding layer with open cells are thus formed. However, as illustrated in the drawing, the second slab 10 is omitted.

In addition to the mechanical bond between the glass and the polyurethane, it is to be understood that the latter is also strongly physio-chemically bonded to the glass by adhesion between the surface of the glass and the plastic material. This will admit of the use of foamed layers for bonding setting mortars to plane glass. After the plastic layer has adequately foamed and has set to a solid state, the surface thereof preferably is removed as for example by splitting with an appropriate knife 13 or an endless band of steel driven upon rollers and being provided with a slicing edge. The removal of the surface layer provides a layer 14 of solid, foamed polyurethane resin which also has a surface composed of cells or bubbles, portions of which have been sectioned away to provide a series of minute depressions or open pockets 15 adapted to receive the plastic layer. The resultant surface is well adapted to receive a mortar material such as well known gypsum plaster which comprises a mixture of water and dehydrated gypsum often mixed with a fibrous material such as wood fiber or other fiber adapted to give increased tensile strength of the plaster layer formed from the material. It will also receive a mortar of Portland cement and sand.

The foam layer is non-tacky so that slabs of cellular glass can be stacked and shipped without danger of one slab sticking to the other. Indeed the foam coatings act as excellent cushions which prevent the blocks from abrading each other and they provide a cushioning action in stacks of the blocks, preventing them from breaking when heavily jarred.

In applying the mortar of plaster or cement to the cellular surface of the polyurethane foam layer, the mixture of pulverulent gypsum or cement is incorporated with water in well known manner and may be spread upon the slab and while it is still mushy, it folds into and assumes the shape of the cells. After the gypsum or cement has set, it will be found that it is quite securely bonded to the polyurethane foam layer which in turn is bonded to the cellular glass body.

When the plaster is applied, the foam layer between it and the cellular glass is of highly yieldable character and permits adequate differential of contraction and expansion due to thermal changes and also to the contraction due to the setting of the plaster layer.

Figure 6:
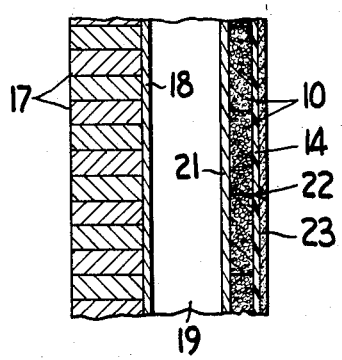
Fig. 6 is a sectional view of a fragment of a building wall embodying slabs of cellular glass having a facing of polyurethane resin and a layer of plastic adhered to the foam.

In Fig. 6 is illustrated a small section of a wall, such as an outer wall of a building embodying slabs of cellular glass as an insulating layer, the glass being provided with a plaster facing adhered thereto by a polyurethane foam layer. The construction, as shown, includes an outer curtain layer 17 which may be of brick, stone, concrete or any other appropriate material and which may be disposed contiguous to a sheathing 18 of boards, wall board or other material secured upon a framework such as studdings 19 of wood or the like. Upon the inner edges of the studdings 19 is disposed a layer 21 of a suitable lathing material such as gypsum boards or the like secured by nails (not shown) and providing a backing for the insulating layer 22 which may be of slabs of cellulated glass corresponding to the slab 10 already referred to. Each of these slabs is faced with the bonding layer 14 of cellulated polyurethane resin having open cells forming the surface thereof and being formed in the manner already described. This cellulated layer of polyurethane resin may be applied individually to the slabs of foamed or cellulated glass as they are produced in the factory. The several slabs going to form the insulating layer 22 may be secured in position by a mastic, such as a mixture of asphalt and a pulverulent filler, adhering the individual slabs to the backing 21. Other bonding materials including a foamable mixture of a polyester containing hydroxyls and a compound containing a plurality of isocyanate groups may also be applied to bond the slabs of cellulated glass to the backing layer.

Plaster in the form of a mortar is spread as a layer 23 over the surface of the slabs having the coatings of polyurethane resin foam and is allowed to harden in well known manner. The plastering operation is usually performed upon the job and the layer formed provides a continuous sheet covering the slabs and the joints between them. Layer 23 is, in effect, composed of an inner surface layer composed of small protuberances corresponding to the pockets and serving to key the plaster to the foamed polyurethane layer. These protuberances are integrally joined to the main body of the plaster layer, which may have a smooth outer face. The protuberances key or lock the nonadhesive plaster or cement layer to the polyurethane foam layer and the latter, in turn, secures the layer to the glass backing.

The foamed layers as described comprising the polyurethane resin, for purposes of economy, should be relatively thin preferably not over about 1/8 of an inch thick and may be substantially thinner, for example 1/16 of an inch or even 1/32 of an inch. If economy is not necessary, this thickness may be increased to any desired extent.

The formation of the foamed layers in situ upon the surface of the cellular glass foam to take advantage of the bonding action between the foam and the glass has been described. It will be apparent, however, that relatively thick sheets or slabs of foam may be foamed in molds in conventional manner and this slab may then be sliced into thin sheets of appropriate thickness, e.g. 1/16 to 1/8 of an inch, and these foams may be secured in place upon the surface of the cellular glass by appropriate bonding agents, such as rubber cement, bituminous mastic or other agent. The open surface cells of the cellular sheet are well adapted to receive mortars of gypsum plastic and Portland cement and the layers thereof when set, are strongly but resiliently bonded to the backing layer.

Figure 5:
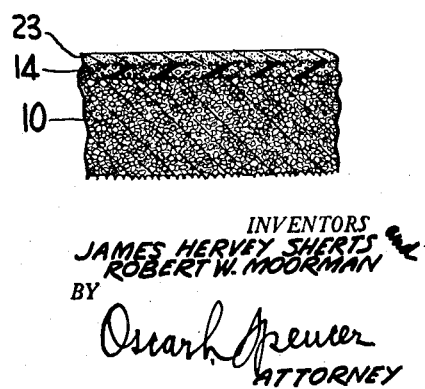
Fig. 5 is a fragment of the same slab after the mortar has been applied.

The foamable compositions suitable for forming the layer L of Fig. 5 usually will fall approximately within the following ranges of proportions:

| | Parts by weight |
|---|---|
| Hydroxyl containing resin | 100 |
| Emulsifier | 0.1–10 |
| Catalyst | 0.2–5 |
| Water | 0.1–5 |
| Diisocyanate | 20–100 |

The hydroxyl component is made up with the water and emulsifier as component A. It may be of an acid number of about 0 to 60, but preferably of 1 to 15 and of a hydroxyl number of about 20 to 500 to 600.

The diisocyanate (component B) may be added as such to component A or may be made up as prepolymer with a part of the hydroxy component and then added to component A.

Specific examples illustrating the preparation and application of foamable mixtures suitable for application to the slab of foamed glass illustrated in the drawings are as follows.

Example 1

A polyester, which with a diisocyanate, reacts to form a flexible foam was prepared from the following components:

| | |
|---|---|
| Adipic acid | 16 moles. |
| Diethylene glycol | 18 moles. |
| Glycerine | 1 mole. |
| Catalyst of esterification (tolylene sulfonic acid) | 0.1 percent based upon the mixture. |

This mixture was reacted in conventional manner by heating the mixture to evolve water until the acid value was reduced to a value of less than 12 and until a hydroxyl value of 60 to 80 was obtained. This aqueous emulsion of the polyester is well adapted to react with a diisocyanate to form a flexible foam upon cellular glass or other rigid backings.

An appropriate isocyanate material for blending with this polyester emulsion comprises tolylene diisocyanates, such as is sold under the trade name of Mondure-TD or Hylene-TM. Various tertiary amines may be employed as catalysts, though one of the more satisfactory, as thus far obtained, comprises N-methyl morpholine.

If desired, the diisocyanate may be reacted with a portion of the polyester component of the interpolymerizable mixture to provide a so-called prepolymer. This reaction preferably is effected in the substantial absence of water and may be performed in the presence or absence of catalysts of interpolymerization. The interpolymer as thus obtained may then be blended with additional polyester emulsified with water, or containing a hydrating agent. An appropriate prepolymer composition may be formulated as follows:

| | Parts by weight |
|---|---|
| Polyester (same as described) | 100 |
| Tolylene diisocyanate (Mondure-TD) | 150 |
| N-methyl morpholine | 2 |
| Emcol-H-77 | 2 |

This mixture will react at room temperature or the reaction may be expedited by moderately heating to form the prepolymer. This prepolymer is a liquid and will stand for long periods of time without undue thickening.

The prepolymer so formulated may be component B of a foamable mixture. An appropriate polyester mixture which may be package A and as such can be mixed with package B may be formulated as follows:

| | Parts by weight |
|---|---|
| Polyester (as above described) | 100 |
| N-methyl morpholine | 5 |
| Emcol-H-77 (Emulsifying agent) | 2 |
| Water | 1-2 |

Components or packages A and B may be blended, as for example, by feeding them simultaneously into turbo mixer T and then feeding them as layer L upon slab 10. The mixture as thus obtained will foam and cure at room temperature but the reaction to the final cured state may be expedited, if desired, by heating the mixture to a temperature of about 220° F.

Diisocyanate may also be reacted directly with polyester without the preparation of a prepolymer. This technique is illustrated by the following example:

*Example II*

The polyester of this example was of the same composition as disclosed in Example I. Polyester in a ratio of 100 parts by weight was emulsified with 2 parts by weight of water, 2 parts of weight of emulsier, namely Emcol–H–77, and 1 gram of N-methyl morpholine (a catalyst) as component A. This emulsion was fed continuously through one hose connection into a turbo mixer while 25 parts by weight of tolylene diisocyanate isomers, sold commercially under the trade name of Mondure-T.D. was fed in through the other. The mixture, as it was formed, was distributed upon a surface of cellular glass slab 10 having open cells on said surface so that it permeated into said open cells. A slab of cellular glass similar to the first was disposed upon the top of the foamable mixture, the mixture was then allowed to foam and cure. The curing could be effected at room temperature, but could also be expedited by heating for example to 220° F. or thereabouts until a solid, non-tacky layer was obtained. The thickness of the foam layer between the two slabs of cellular glass was approximately ½ inch. This thickness could be increased or decreased as desired. Thicknesses down to ⅛ inch or even less are contemplated. It is an advantage that the thickness of the foam layer in the three layer sandwich is twice the thickness desired in the foam coatings of the cellular glass slabs.

After the foam had adequately cured, the layer thereof was split apart approximately upon a median plane to provide two slabs of cellular glass having polyurethane foam layers upon a face thereof, the faces of the layers were composed of open cells and the coated bodies were adapted for assembly into a wall and subsequently coating with a mortar material as for example of conventional gypsum wall plaster or with Portland cement composition adapted to flow to fill the open cells in the surface of the polyurethane layer.

The polyester of the preceding example is well adapted for the preparation of more flexible types of foams. It will be understood by those skilled in the art that more rigid types of foams of polyurethane often possess adequate resiliency to admit of the use thereof as a joint material between a slab of foam glass and a mortar coating. The following constitutes a typical example illustrating the use of such polyester adapted to form rigid foams.

*Example III*

The polyester comprised:

| | Moles |
|---|---|
| Phthalic anhydride | 1 |
| Adipic acid | 5 |
| Glycerol | 8 |

This mixture was cooked to an acid value of about 10 and to a high hydroxyl value. This polyester, when substituted for the polyester previously described in Examples I or II in the preparation of the polyurethane resin interlayer material, forms a relatively rigid foam the cells of which are closed and water resistant.

This polyester may be made up into a polyester component (A) of the following composition:

| | Parts by weight |
|---|---|
| Polyester | 163 |
| Emulsifier (Tween–40) | 2 |
| Catalyst (Dimethylethanol amine) | 0.5 |
| Water | 4 |

Component (B) may be made up as a prepolymer of:

| | Parts by weight |
|---|---|
| Polyester | 129 |
| Tolylene diisocyanate (mixed isomers) | 522 |

Mixing is effected over a period of 2 or 3 hours. The temperature is 35° C. The mixture is then held at 65° C. to 95° C. until a viscosity of Z is attained. This prepolymer constitutes component B. Components A and B may be fed to the mixer in ratios of 169.5 parts by weight of the former to 187 parts by weight of the latter.

The mixture is then spread upon a slab 10 of cellular glass and with or without application of a second slab is foamed and cured to provide an adherent foam layer, the cells of which can be opened as previously described. The open cells will receive and retain mortars of gypsum plaster or Portland cement, as previously described. As compared to the cellular glass layer and the plaster or cement layer, the foam layer is highly yieldable and will accommodate for relative shrinkages between the layers which are bonded together.

In the preceding examples, the hydroxyl containing components of the foamable mixture were polyesters of the alkyd type. It is to be appreciated that these polyesters may be replaced by other compounds containing a plurality of hydroxyls. The following constitutes an example illustrating one such component.

| | Parts by weight |
|---|---|
| Castor oil | 85 |
| Polyethylene glycol (molar weight about 200) | 15 |
| Emulsifier (Emcol–H–77) | 2 |
| Water | 3–4 |
| Catalyst (N-methyl morpholine) | 2 |

This mixture may flow continuously into a conventional turbo mixer while an appropriate diisocyanate, e.g. tolylene diisocyanate mixed isomers containing approximately 80 percent of 2,4-isomer and 20 percent 2,6-isomer, is added in an amount equivalent to about 2.8 moles per mole of available hydroxyls. The mixture thus formed may be spread in the manner described in Example II upon a slab of cellular glass and the mixture may be allowed to cure by aging or by baking at about 220° F. The surface cells of such foam layer can be opened by cutting or by abrasion and will receive and retain mortars of gypsum plaster or Portland cement to key a surface layer of the same to the cellular glass.

It is to be appreciated that the ester materials described in Examples I, II and III may be replaced by still other compounds of relatively high molecular weight containing a plurality of hydroxyls per molecule. The polyether of butane diol-1,4 constitutes an example of such material.

*Example IV*

An emulsion thereof may be made up comprising butane-diol-1,4 polyether of a molecular weight of 3,000 containing approximately 2 hydroxyls per chain, 100 parts by weight; N-methyl morpholine, 2 parts; Mondure-TD (diisocyanate mixed isomers), 25 parts; Emcol–H–77, 2 parts; water, 2 parts. This composition may then be applied to cellular glass slabs in the manner already described and cured to provide a foam interlayer for binding plaster or concrete to the glass slab. The slab may be coated upon one side and cured with or without the application of a second slab. If the coating operation is so performed, the surface skin may be broken or removed in the manner already described to permit the mortar material to penetrate into the open cells.

If it is desired to increase the water resistance of the bond between the cellular glass and the foamed polyurethane resin, the surface of the former may be preliminarily coated by spraying with a primer such as an epoxy resin. The resin is a polyether formed by condensing p-p'-bis(hydroxyphenyl)isopropane which is termed Bisphenol A with epichlorohydrin in the presence of sodium hydroxide.

In the preceding examples, mortars and plasters may be replaced by paints, plastisols and organisols to provide plastic coatings upon the foam. It is thus within the purview of the invention to substitute a spreadable putty-like or paste-like plastic composition for the mortar. For example, a thick paint of polyvinyl acetate, or a plastisol or an organisol of polyvinyl acetate-polyvinyl chloride copolymer or other plastic may be spread upon a layer of a polyurethane foam upon a slab of foamed or cellulated glass. The material will flow into the opened surface cells of the foam and will become keyed thereto in the same manner as the plaster or cement.

An appropriate paint may comprise a conventional latex of polyvinyl acetate as an aqueous emulsion. If desired, the latex may include a thickening agent, such as carboxy-methocell in order to impart body thereto. An appropriate plastisol may comprise a conventional mixture of a copolymer of vinyl acetate and vinyl chloride with a liquid polyester of a dicarboxylic acid and a polyhydric alcohol as the plasticizing agent. The proportions are such as to provide a spreadable mixture.

An organisol may comprise the same copolymer dispersed with a small amount of a plasticizer such as a polyester and being dispersed in a non-solvent liquid hydrocarbon.

When these compositions are spread and heated, in well known manner, they are solidified into a coherent, hard layer, keyed to the polyurethane foam. This layer provides a surface finish upon the cellulated glass.

The foam layer will prevent any tendency of the plastic layer to shear from the glass due to shrinkages in setting or due to thermal expansions or contractions.

The expression mortar-like materials as used hereinafter is the claims includes these paints, plastisols, organisols and similar materials adapted to be spread and set to form a definite surface layer upon the polyurethane foam.

An appropriate composition comprises a commercial epoxy resin sold as Epon 1007. This may be modified with small amounts of urea-formaldehyde and phenol-formaldehyde resins. The composition is as follows:

| | Parts by weight |
|---|---|
| Epon resin | 72.0 |
| Phenolic resin | 15.5 |
| Urea resin | 12.5 |

The composition may further contain pigments, such as titanium dioxide in an amount to provide a vehicle to pigment ratio of 1.95 to 1. The mixture may also contain solvent such as diacetone alcohol in an amount to obtain satisfactory viscosity.

If desired, a silicone resin in the form of silicone oil may be added.

The forms of the invention as herein shown and described are to be considered as being by way of example. It will be apparent to those skilled in the art that numerous modifications may be made therein without departure from the spirit of the invention or the scope of the appended claims.

We claim:

1. In a method of securing a mortar material which is adapted to set to a hard, brittle state to cellular glass, the mortar material in setting, being subject to shrinkage with respect to the glass, the steps which comprise spreading upon said cellular glass a layer of a mixture of two components (A) and (B) which are adapted to react to form a foam of polyurethane resin, (A) being a mixture of an alcohol containing a plurality of hydroxyls and a material of a class consisting of water and a hydrated salt adapted to decompose in the mixture to supply water and (B) being an organic material containing a plurality of isocyanate groups per molecule, at least one of said components containing a catalyst of interpolymerization of the two components, foaming and curing the mixture, slicing away the surface portion of the foamed layer, applying said mortar to the sliced away surface of the foamed layer to fill the cells and allowing the mortar to harden.

2. In a method of coating a unit of cellular glass comprising a foam-like mass of cells, an outer layer of the unit being sectioned away to provide a surface comprising a multitude of open pockets, the steps of applying to the surface an adherent layer of a polyurethane foam, the exposed portion of the latter layer also being cut away to provide a surface composed of a multitude of minute pockets, applying to the latter surface a layer of mortar adapted to fill the pockets in the latter surface, said mortar being capable of hardening and while hardening, of shrinking with respect to the glass and then allowing the mortar to harden to form said coating.

3. In a method of coating a unit of cellular glass comprising a foam-like mass of cells, and having a surface comprising a multitude of open pockets, the steps of applying to the surface a liquid, foamable mixture of an organic polyisocyanate and an organic polyhydroxide, the foamable mixture being adapted to fill the pockets in the surface and of forming foamed and cured polyurethane resin, foaming and curing the resin, sectioning away the outer portion of the foamed and cured resin to provide a surface composed of a multitude of minute pockets, applying to the latter surface a layer of mortar adapted to fill the pockets in the surface, said mortar being capable of hardening and while hardening, of shrinking with respect to the glass and then allowing the mortar to harden to form said coating.

4. As an article of manufacture a body of glass having a layer of foamed polyurethane resin bonded thereto, the outer portion of the foamed polyurethane resin being cut away to provide a surface composed of minute open pockets and a layer of hardened mortar upon said surface and filling the pockets to key the latter layer in place, the mortar being of a material which, in hardening, shrinks substantially with respect to the glass.

5. As an article of manufacture, a body of cellular glass having an outer layer thereof cut away to provide a surface composed of a multitude of minute open cells, a layer of foamed polyurethane resin bonded thereto, the outer portions of the foamed polyurethane resin also being cut away to provide a surface composed of minute open pockets and a layer of hardened mortar upon the latter surface filling the pockets of the same to key the latter layer in place, the mortar being of a material which in hardening, shrinks substantially with respect to the glass.

6. As an article of manufacture a body of cellular glass having an outer layer cut away to provide a surface composed of a multitude of open pockets a layer of foamed polyurethane resin upon the surface and filling the pockets in the latter, the outer layer of the foamed polyurethane resin also being cut away to provide a surface composed of minute open pockets and a layer of hardened mortar upon the latter surface and having portions filling the pockets to key the latter layer in place, the mortar being of a material which in hardening shrinks substantially with respect to the glass.

7. A body as defined in claim 6 in which the mortar is of gypsum.

8. A body as defined in claim 6 in which the mortar is of Portland cement.

9. The method of claim 3 in which the mortar is of Portland cement.

10. The method of claim 3 in which the mortar is of dehydrated gypsum.

References Cited in the file of this patent

UNITED STATES PATENTS

| | | |
|---|---|---|
| 2,135,544 | Turk | Nov. 8, 1938 |
| 2,626,886 | Scholl | Jan. 27, 1953 |
| 2,753,276 | Brochhagen et al. | July 3, 1956 |

OTHER REFERENCES

Bjorksten et al.: Polyurethane Resins, Modern Plastics, vol. 31, No. 8 (1954), pp. 143–146, 228–230, 233.

Modern Plastics, Polyurethanes on the Way, vol. 32, No. 12, August 1955, pp. 102–104, 212, 213, 215.

UNITED STATES PATENT OFFICE

CERTIFICATE OF CORRECTION

Patent No. 2,888,360                                May 26, 1959

James Hervey Sherts et al.

It is hereby certified that error appears in the printed specification of the above numbered patent requiring correction and that the said Letters Patent should read as corrected below.

Column 5, line 12, for "folds" read -- flows --; column 6, line 26, before "prepolymer" insert -- a --; column 7, line 14, for "mixture" read -- mixtures --; line 26, for "of weight of emulsier" read -- by weight of emulsifier --; column 9, line 47, for "is the" read -- in the --.

Signed and sealed this 13th day of September 1960.

(SEAL)
Attest:
KARL H. AXLINE
Attesting Officer

ROBERT C. WATSON
Commissioner of Patents